Figure 1:
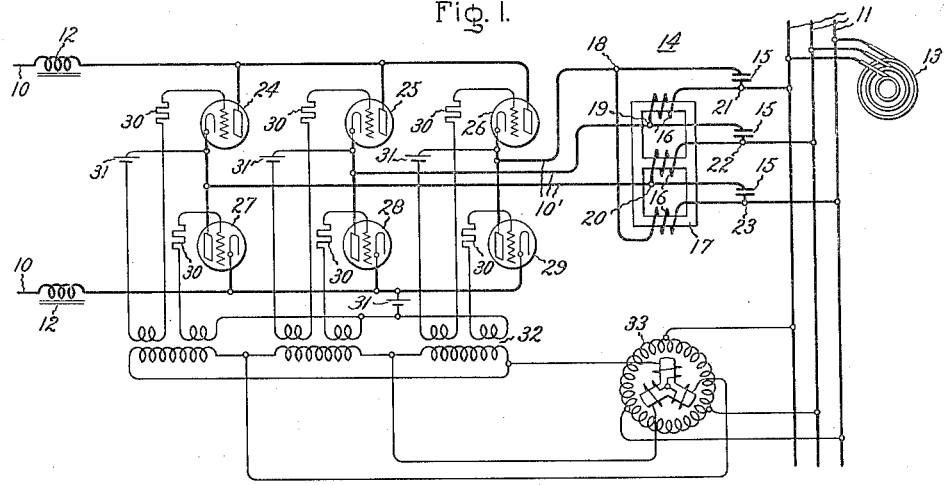

Nov. 10, 1936.  C. H. WILLIS ET AL  2,060,650

ELECTRIC POWER CONVERTING APPARATUS

Filed March 24, 1936  3 Sheets-Sheet 1

Inventors:
Clodius H Willis,
Burnice D. Bedford,
by Harry E. Dunham
Their Attorney.

Nov. 10, 1936.   C. H. WILLIS ET AL   2,060,650
ELECTRIC POWER CONVERTING APPARATUS
Filed March 24, 1936   3 Sheets-Sheet 3

Inventors:
Clodius H. Willis,
Burnice D. Bedford,
by Harry E. Dunham
Their Attorney.

Patented Nov. 10, 1936

2,060,650

UNITED STATES PATENT OFFICE 2,060,650

ELECTRIC POWER CONVERTING APPARATUS

Clodius H. Willis, Princeton, N. J., and Burnice D. Bedford, Schenectady, N. Y., assignors to General Electric Company, a corporation of New York Application March 24, 1936, Serial No. 70,574

25 Claims. (Cl. 171—97)

Our invention relates to electric power converting apparatus and more particularly to polyphase converting apparatus comprising capacitive and inductive elements arranged for transforming alternating current energy from constant voltage to constant current or vice versa.

The arrangement of reactances of opposite sign in the form of a square for single phase circuits has been known for many years and is commonly referred to as the monocyclic square. In conformity with this established nomenclature, we have adopted the term monocyclic network to include arrangements of reactances of opposite sign for converting alternating current from constant potential to constant current or vice versa for both the single and polyphase circuits. The polyphase monocyclic network when used in connection with polyphase circuits presents various operating difficulties particularly with regard to unbalance in the voltage of the constant polyphase voltage circuit, inequalities in the reactive elements of the monocyclic network and unbalanced load conditions in the polyphase constant current circuit. Thus, if the polyphase constant potential voltages are unbalanced or the loads are unbalanced on the several phases of the constant current side with no inequalities between the reactive elements of the monocyclic network, undesirable voltage stresses may occur in the several elements of the monocyclic network. Similarly, if there are relatively slight inequalities between the respective reactance elements of the monocyclic network with the other conditions balanced, voltage stresses of relatively great magnitude may be imposed on some of the elements of the monocyclic network.

Although our invention is applicable for use in connection with electric circuits and systems generally, it is particularly applicable for use in connection with direct current power transmission systems of the type described and claimed in United States Letters Patent No. 1,990,758, granted February 12, 1935, upon an application of Charles W. Stone and assigned to the assignee of the present application. In the system disclosed in the Stone patent, electric energy in the form of alternating current of constant voltage is transformed to alternating current of constant value and then rectified by electronic means and transmitted as constant direct current to electronic inverting means for changing the transmitted energy to alternating current of constant value which in turn is converted back to alternating current of constant voltage. The electronic converting stations of this system employ as one means of transforming alternating current from constant voltage to constant current or vice versa, monocyclic networks. In operating a transmission circuit of the above type utilizing a polyphase monocyclic network in combination with an electronic converter and a direct current circuit with a smoothing reactor, we have found that relatively small inequalities in the reactance elements of the monocyclic network may cause relatively large inequalities between the voltages of the symmetrical portions of the circuit. Thus, if the constants of the individual phases are different, each phase of the monocyclic network will try to maintain a different value of current in its constant current line. The reactor utilized in the direct current line imposes the condition that the alternating currents in the respective phase conductors shall all have the same instantaneous value. These two conflicting conditions —the monocyclic network trying to maintain different currents in each line and the d—c reactor trying to hold the three currents the same —may cause considerable load or voltage unbalance on the constant current alternating current lines. Furthermore, by reason of the inequalities mentioned some of the reactive elements of the monocyclic network may be subjected to higher voltages than when balanced conditions exist and would require for purposes of good design a more liberal kv—a. rating of the reactive elements. However, such design requirements are not conducive to the most economical use of materials and by our invention we are enabled to use reactive elements of a lower kv—a. rating than would be required if the effect of the inequalities were not eliminated or reduced.

It is an object of our invention to provide improved means for converting alternating current energy from constant voltage to constant current.

It is another object of our invention to provide improved polyphase monocyclic networks.

It is a further object of our invention to provide improved apparatus for transmitting and distributing electric power by monocyclic networks and electronic means.

In accordance with the broader aspects of our invention, we provide means to relate the respective reactance elements of the monocyclic network so that the vector sum of the polyphase voltages of the reactance elements of like sign at any instant shall be substantially zero. In accordance with one form of our invention we relate reactance elements of the monocyclic network by providing inductive or transformer means directly associated with reactance elements of like sign. In accordance with another form of our invention, we relate the reactance elements of the monocyclic network through suitable inductive or transformer means associated with the external phase conductors of the monocyclic network.

Figure 2:
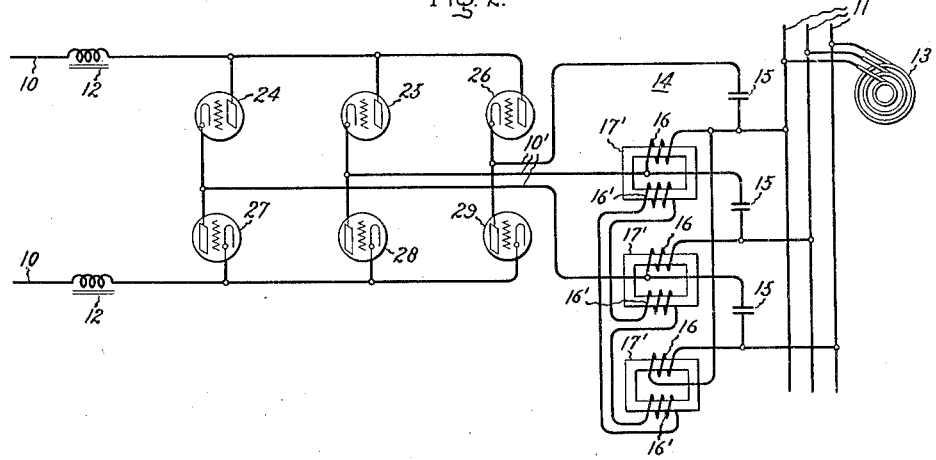
Figure 3:
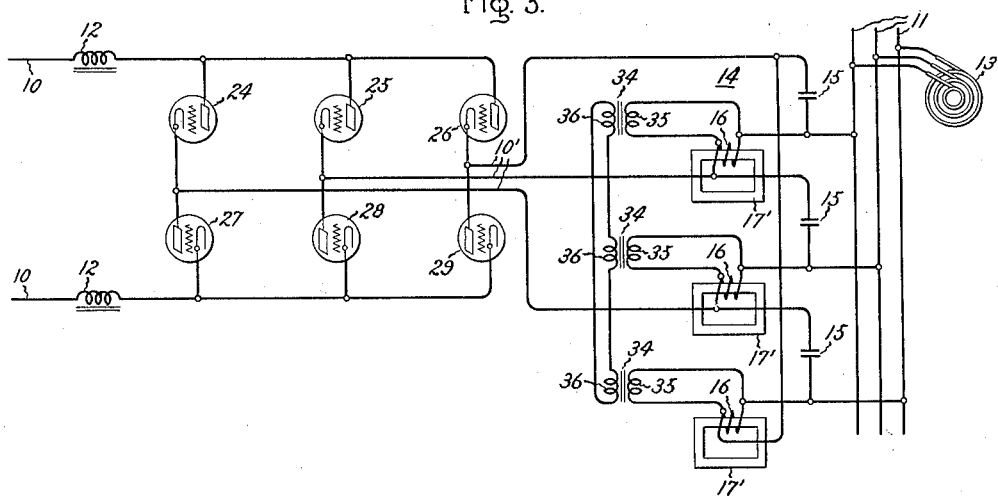
Figure 4:
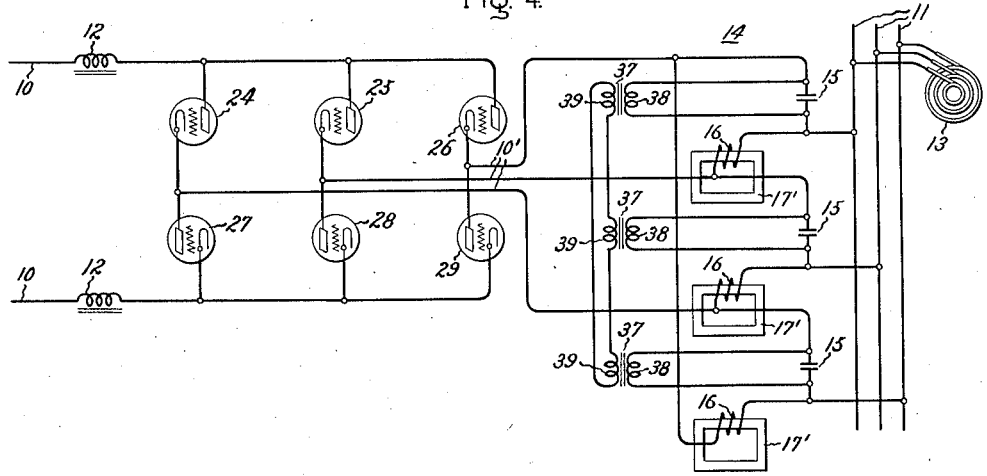
Figure 5:
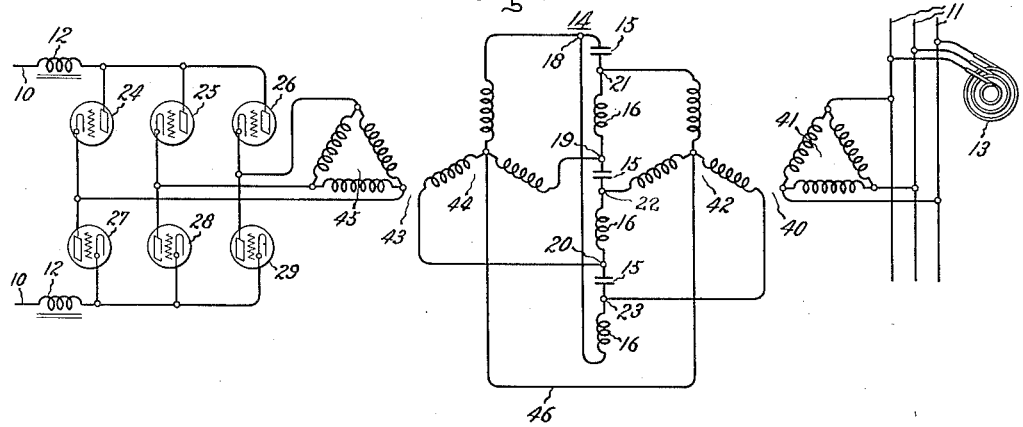
Figure 6:
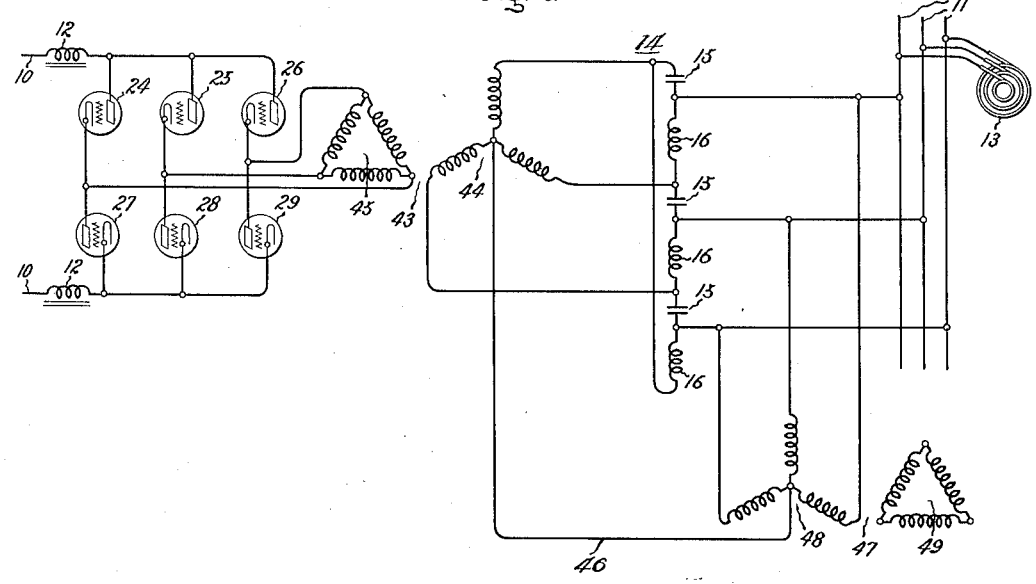

Our invention will be better understood by reference to the following description taken in connection with the accompanying drawings in which Figs. 1, 2 and 3 show diagrammatically embodiments of our invention in which the inductive elements of the monocyclic network are inductively coupled by means directly associated with the inductive elements; Fig. 4 shows diagrammatically a further embodiment of our invention in which the capacitive elements of the monocyclic network are directly inductively coupled, and Figs. 5 and 6 show diagrammatically embodiments of our invention in which the reactance elements of the monocyclic network are related through inductive or transformer means associated with the external phase conductors of the monocyclic network.

Referring now to Fig. 1 of the drawings, we have shown electronic converting apparatus which is illustrative of converting apparatus for either rectifier or inverter operation. The apparatus as illustrated is adapted to transmit energy between a direct current circuit 10 and a polyphase alternating current circuit shown as a three-phase alternating current circuit 11. Smoothing reactors 12 are connected in the direct current circuit and an independent source of alternating current 13 is connected to the circuit 11.

A polyphase monocyclic network 14 is arranged for converting electric energy from constant voltage to constant current or vice versa, and comprises capacitive elements 15 and inductive elements comprising windings 16. The capacitive elements and inductive elements may be arranged alternately in any suitable polyphase network and as shown a mesh or delta connection provides a satisfactory arrangement. In accordance with this embodiment of our invention, the inductive elements are inductively coupled by placing the windings 16 on the respective legs of a three-legged core 17. The monocyclic network is provided with terminals 18, 19 and 20, respectively, for connection to a constant alternating current circuit 10′ and with terminals 21, 22 and 23 for connection to the constant voltage circuit 11. If balanced conditions exist for the monocyclic network, the sum of the three fluxes caused by the currents of the windings 16 in the core 17 at any instant must be zero. However, if unbalanced conditions exist, due to unbalanced voltages in circuit 11, unbalanced currents in circuit 10′ or inequalities in the impedances of the several reactive elements of the network, a resultant flux traverses the core 17 so as to reduce greatly any tendency toward unbalanced voltage or current conditions. The voltages across the several reactors may not necessarily be made equal but by inductively coupling the inductive elements in accordance with our invention the vector sum of the polyphase voltages of the respective elements of like sign of the monocyclic network will at any instant be zero or substantially zero.

In the application of our improved monocyclic network to transmission systems of the type illustrated, we connect the terminals 18, 19 and 20 to one side of the direct current circuit 10 through electronic converting means comprising a group of similarly disposed electric valves 24, 25 and 26 and to the other side of the direct current circuit 10 through an oppositely connected group of similarly disposed electric valves 27, 28 and 29. Each of the electric valves 24—29, inclusive, is provided with an anode, a cathode and a control electrode or grid. By reason of the fact that the monocyclic network effects a reversal of power factor angle between the constant potential and constant current circuit, we may utilize phase commutation to commutate the current between the several similarly connected electric valves. This feature of the circuit as illustrated is described and claimed in our copending application Serial No. 758,396, filed December 20, 1934, and assigned to the assignee of the present application.

Although many refinements in excitation circuits have been developed for electronic converters for use in systems of this type, we have shown a simplified excitation control circuit since the particular excitation circuit used has no particular relation to our present invention. In order to render the electric valves 24—29, inclusive, alternately conductive and non-conductive in the proper sequence, the grid of each of these valves is connected to its respective cathode circuit through a current limiting resistor 30 and a bias battery 31 and the proper phase winding of the secondary windings of a grid transformer 32 the primary windings of which may be energized through any suitable phase shifting arrangement, such as a rotary phase shifting transformer 33. In case the alternating current circuit 11 is not connected to an independent source of electronic force for determining its frequency, the primary winding of the phase shifting transformer may be energized from any suitable source of alternating current of a frequency at which it is desired to supply the circuit 11.

The general principles of operation of the system as illustrated for transmitting current from the direct current circuit 10 to the constant potential alternating current circuit 11 is substantially as follows: If it is assumed that the valves 25 and 27 are initially rendered conductive, current will flow from the upper positive side of the circuit 10 through the valve 25, the capacitor and inductor between terminals 19 and 20, the valve 27, to the other side of the direct current circuit. Assuming phase rotation with reference to the terminals 18, 19 and 20 to be 19, 20 and 18, substantially sixty electrical degrees later, electric valve 29 will be rendered conductive and the current commutated from valve 27 to 29. Sixty degrees later, electric valve 24 will be rendered conductive and the current commutated from valve 25 to valve 24. In this manner the current is successively commutated between the several valves to supply polyphase current to the circuit 11.

In the embodiment of our invention illustrated in Fig. 2 we have illustrated the same converter arrangement and have also indicated like elements with the same reference numerals. We have omitted in the drawings, for purposes of simplifying our disclosure, the grid excitation circuits but it is to be understood that this embodiment of our invention as well as the embodiments shown in Figs. 3, 4, 5 and 6 are to be considered as being provided with suitable grid excitation circuits such as that shown in Fig. 1. In this modification of our invention, we utilize independent cores 17' for the several inductive elements 16 and inductively couple the respective inductive elements of the monocyclic network by connecting windings 16' on each of the individual cores 17' and connect the windings 16' in series relation so that any voltage difference or current in the windings 16 produces a flux in the respective cores 17' to circulate a resultant current in the closed circuit of the windings 16' to reduce any tendency to unbalance conditions in the monocyclic network.

The embodiment of our invention illustrated in Fig. 3 is identical with the arrangement shown in Fig. 2 except that the coupling windings 16' are omitted on the cores 17' of the inductive elements 16 and these elements are inductively coupled by means of coupling transformers 34 each comprising a primary winding 35 connected across the respective windings 16 and secondary windings 36 which are connected in series relation for providing a path for a resultant balancing current to flow, which operates in a manner similar to the windings 16' in Fig. 2.

In Fig. 4 we have shown the same arrangement of circuits for the power transmission system with like elements indicated by the same reference numerals, but in the monocyclic network 14 the capacitive elements 15 are inductively coupled instead of the inductive elements 16 by means of coupling transformers 37 each having a primary winding 38, connected across the respective capacitors 15, and secondary windings 39 which are connected in series relation for providing a path for a resultant balancing current to flow which functions in a manner similar to the windings 16' in Fig. 2.

It is believed the operation of the arrangements illustrated in Figs. 2, 3 and 4 will be obvious from the description of the operating cycle of the arrangement shown in Fig. 1 and that no further description is necessary for an understanding of these embodiments of our invention.

In Fig. 5 we have shown another form of our invention differing principally in the fact that the inductive or transformer means for relating the respective reactance elements of the monocyclic network are associated with the external phase conductors of the monocyclic network rather than directly with the several reactance elements of like sign. We have shown the same general power transmission system and have indicated like elements with the same reference numerals. In the present arrangement, a transformer 40 is interposed between the constant potential circuit 11 and the monocyclic network 14. The transformer 40 is mesh-star connected and is shown as a delta-Y power transformer with the delta-connected winding 41 connected to the constant potential circuit 11 and the Y-connected winding 42 connected to the constant potential terminals 21, 22 and 23 of the monocyclic network. Between the monocyclic network and the electronic converter, we interpose a star-mesh connected transformer shown as a three-phase Y-delta power transformer 43 with a Y-connected winding 44 connected to the constant current terminals 18, 19 and 20 of the monocyclic network and a delta-connected winding 45 connected to the respective terminals of the electronic converter. The neutral terminals of the respective Y-connected transformer windings 42 and 44 are interconnected in any convenient manner such as by grounding or through a conductor as diagrammatically indicated by the conductor 46.

In the event of unbalanced conditions such as slight inequalities in the respective elements of the monocyclic network, the conductor 46 affords a path for such components of current as may result from the unbalanced conditions and such currents flowing in the Y-connected windings 42 and 44 induce corresponding currents which circulate in the delta-connected windings 41 and 45 in such a manner as to provide a balancing action so that the vector sum of the voltages of the reactance elements of like sign of the monocyclic network at any instant shall be substantially zero.

The arrangement shown in Fig. 6 is generally the same as the arrangement shown in Fig. 5 but differs therefrom in that we connect the monocyclic network to be energized directly from the constant potential circuit 11 and establish and fix a neutral terminal for the constant potential system of polyphase voltages by a transformer 47 having a Y-connected winding 48 connected in parallel relation with the constant potential terminals of the monocyclic network and a delta-connected winding 49. Similar to the arrangement shown in Fig. 5, the neutral terminals of the transformer windings 48 and 44 are interconnected by the conductor 46. This arrangement operates to effect a balancing action in the same manner as the arrangement illustrated in Fig. 5. The transformer 47 with its closed delta winding 49 establishes and fixes the neutral for the constant potential system of voltages impressed upon the monocyclic network 14 and the delta windings 45 and 49 afford a circulating path for the components of currents to circulate which effect the balancing action.

While we have shown and described particular embodiments of our invention, it will be obvious to those skilled in the art that various changes and modifications may be made without departing from our invention in its broader aspects and we, therefore, aim in the appended claims to cover all such changes and modifications as fall within the true spirit and scope of our invention.

What we claim as new and desire to secure by Letters Patent of the United States is:

1. The combination of a plurality of reactance elements of opposite sign connected in a polyphase network for transforming electric energy from constant potential to constant current, and means relating reactance elements of said network so that the vector sum of the voltages of reactance elements of like sign at any instant shall be substantially zero.

2. The combination of a plurality of reactance elements of opposite sign connected in a polyphase network for transforming electric energy from constant potential to constant current, and inductive means relating reactance elements of said network so that the vector sum of the voltages of reactance elements of like sign at any instant shall be substantially zero.

3. A polyphase monocyclic network comprising reactance elements of opposite sign arranged for transforming electric energy from constant potential to constant current and having reactance elements of said network inductively related so that the vector sum of the voltages of reactance elements of like sign at any instant shall be substantially zero.

4. The combination of a plurality of reactance elements of opposite sign connected in a polyphase network for transforming electric energy from constant potential to constant current, and transforming means connected to said network and including a closed electric circuit for inductively relating reactance elements of said network.

5. The combination of a plurality of reactance elements of opposite sign connected in a polyphase network for transforming electric energy from constant potential to constant current, and means for inductively relating reactance elements of like sign.

6. The combination of a plurality of reactance elements of opposite sign connected in a polyphase network having input and output phase-conductors for transforming electric energy from constant potential to constant current, and inductive means comprising electric circuits completed independently of said input and output phase-conductors for inductively relating reactance elements of like sign.

7. The combination of a plurality of reactance elements of opposite sign connected in a polyphase network having input and output phase-conductors for transforming electric energy from constant potential to constant current, and inductive means comprising electric circuits completed by including said input and output phase-conductors for inductively relating reactance elements of said network.

8. The combination of a plurality of capacitive elements and a plurality of inductive elements connected alternately in a polyphase network for transforming electric energy from constant potential to constant current, and means for inductively relating said inductive elements.

9. In combination, a plurality of capacitive elements, and a plurality of inductive elements arranged on a common magnetic core, said capacitive and inductive elements being connected to form a polyphase monocyclic network for transforming electric energy from constant potential to constant current.

10. In combination, a plurality of capacitive elements and a plurality of inductive windings connected alternately in three-phase connection and arranged for transforming electric energy from constant potential to constant current, and a three-phase magnetic core for said inductive windings.

11. In combination, a plurality of capacitive elements and a plurality of inductive windings connected alternately in a network for transforming electric energy from constant potential to constant current, a magnetic core for each of said inductive windings, and a plurality of auxiliary windings arranged with one on each of said cores and all connected in a closed circuit in series relation.

12. In combination, a plurality of capacitive elements and a plurality of inductive elements connected alternately in a network for transforming electric energy from constant potential to constant current, and transforming means having primary windings connected respectively to each of said reactive elements of like sign and having the secondary windings thereof connected in series relation in a closed circuit.

13. In combination, a plurality of capacitive elements and a plurality of inductive elements connected alternately in three-phase delta connection and arranged for transforming electric energy from constant potential to constant current, and transforming means having the primary winding thereof connected to capacitive elements and all of the secondary windings thereof connected in series relation in a closed circuit.

14. In combination, a constant potential alternating current circuit, a constant current alternating current circuit, a constant current direct current circuit, converting means interposed between said alternating current circuits for transforming electric energy from constant potential to constant current and comprising a plurality of reactance elements of opposite sign connected alternately in a circuit, means relating reactance elements of said converting means so that the vector sum of the voltages of reactance elements of like sign at any instant shall be substantially zero, and electronic converting means interposed between said alternating current circuit of constant current and said direct current circuit.

15. In combination, a constant potential alternating current circuit, a constant current alternating current circuit, a constant current direct current circuit, converting means interposed between said alternating current circuits for transforming electric energy from constant potential to constant current and comprising a plurality of reactance elements of opposite sign connected alternately in a circuit, inductive means relating reactance elements of said converting means so that the vector sum of the voltages of reactance elements of like sign at any instant shall be substantially zero, and electronic converting means interposed between said alternating current circuit of constant current and said direct current circuit.

16. In combination, a constant potential alternating current circuit, a constant current alternating current circuit, a constant current direct current circuit, converting means interposed between said alternating current circuits for transforming electric energy from constant potential to constant current and comprising a plurality of reactance elements of opposite sign connected alternately in a circuit, inductive means comprising electric circuits completed independent of the conductors of said constant potential and constant current circuits for inductively coupling reactances of like sign, and electronic converting means interposed between said alternating current circuit of constant current and said direct current circuit.

17. In combination, a constant potential alternating current circuit, a constant current alternating current circuit, a constant current direct current circuit, converting means interposed between said alternating current circuits for transforming electric energy from constant potential to constant current and comprising a plurality of reactance elements of opposite sign connected alternately in a circuit, inductive means comprising electric circuits completed by including the phase conductors of said constant potential and constant current circuits, and electronic converting means interposed between said alternating current circuit of constant current and said direct current circuit.

18. In combination, a constant potential alternating current circuit, a constant current alternating current circuit, a constant current direct current circuit, converting means interposed between said alternating current circuits for transforming electric energy from constant potential to constant current and comprising a plurality of capacitive and inductive elements connected alternately in a network and having a magnetic core common to all of said inductive windings, and electronic converting means interposed between said alternating current circuit of constant current and said direct current circuit.

19. In combination, a constant potential alternating current circuit, a constant current alternating current circuit, a constant current direct current circuit, converting means interposed between said alternating current circuits for transforming electric energy between said circuits and comprising a plurality of reactance elements of opposite sign connected alternately in a circuit, a plurality of windings coupled to said elements of like sign and connected in series relation in a closed circuit, and electronic converting means interposed between said alternating current circuit of constant current and said direct current circuit.

20. In combination, a three-phase constant potential alternating current circuit, a three-phase constant current alternating current circuit, a direct current circuit, a polyphase monocyclic network interposed between said alternating current circuits and comprising capacitive and inductive elements connected alternately in a three-phase delta connection and having a separate magnetic core for each of said inductive elements, an auxiliary winding on each of said cores and all of said auxiliary windings being connected in series relation in a closed circuit, and a three-phase electronic converting means interposed between said constant current alternating current circuit and said direct current circuit.

21. In combination, a three-phase constant potential alternating current circuit, a three-phase constant current alternating current circuit, a direct current circuit, a polyphase monocyclic network interposed between said alternating current circuits and comprising capacitive and inductive elements connected alternately in a three-phase delta connection, transforming means having primary windings connected to each of said elements of like sign and having secondary windings connected in series relation in a closed circuit, and a three-phase electronic converting means interposed between said constant current alternating current circuit and said direct current circuit.

22. In combination, a polyphase constant potential alternating current circuit, a polyphase constant current circuit, a polyphase monocyclic network interposed between the alternating current circuits, a transformer interposed between said constant potential circuit and said monocyclic network and having a mesh-connected winding connected to said constant potential circuit and a star-connected winding connected to said monocylic network, a transformer interposed between said monocylic network and said constant current circuit and having a star-connected winding connected to said monocylic network and a mesh-connected winding connected to said constant current circuit, each of said star-connected windings being provided with a neutral terminal, and means for interconnecting said neutral terminals.

23. In combination, a polyphase constant potential alternating current circuit, a polyphase constant current circuit, a polyphase monocyclic network interposed between the alternating current circuits, a transformer having a primary winding connected in star and in parallel relation with the constant potential circuit to said monocyclic network and having a closed circuit mesh-connected secondary winding, a transformer interposed between said monocyclic network and said constant current circuit and having a star-connected winding connected to said monocyclic network and a mesh-connected winding connected to said constant current circuit, each of said star-connected windings being provided with a neutral terminal, and means for interconnecting said neutral terminals.

24. In combination, a polyphase constant potential alternating current circuit, a polyphase constant current circuit, a direct current circuit, a polyphase monocyclic network interposed between the alternating current circuits, a transformer interposed between said constant potential circuit and said monocyclic network and having a mesh-connected winding connected to said constant potential circuit and a star-connected winding connected to said monocyclic network, a transformer interposed between said monocyclic network and said constant current circuit and having a star-connected winding connected to said monocyclic network and a mesh-connected winding connected to said constant current circuit, each of said star-connected windings being provided with a neutral terminal, means for interconnecting said neutral terminals, and electronic converting means interposed between said polyphase constant current circuit and said direct current circuit.

25. In combination, a polyphase constant potential alternating current circuit, a polyphase constant current circuit, a direct current circuit, a polyphase monocyclic network interposed between the alternating current circuits, a transformer having a primary winding connected in star and in parallel relation with the constant potential circuit to said monocyclic network and having a closed circuit mesh-connected secondary winding, a transformer interposed between said monocyclic network and said constant current circuit and having a star-connected winding connected to said monocyclic network and a mesh-connected winding connected to said constant current circuit, each of said star-connected windings being provided with a neutral terminal, means for interconnecting said neutral terminals, and electronic converting means interposed between said polyphase constant current circuit and said direct current circuit.

CLODIUS H. WILLIS.
BURNICE D. BEDFORD.